United States Patent

Groves, Jr. et al.

[15] 3,683,792

[45] Aug. 15, 1972

[54] ELECTRIC BARBEQUE UNIT

[72] Inventors: Richard N. Groves, Jr.; Robert L. Cain; Robert F. Senn, all of Lafayette, Ind.

[73] Assignee: Beatrice Foods Co., Chicago, Ill.

[22] Filed: Nov. 2, 1970

[21] Appl. No.: 86,189

[52] U.S. Cl. .....................99/447, 99/446, 99/450, 126/25
[51] Int. Cl. .............................................A47j 37/07
[58] Field of Search ......................99/450, 446–447, 99/427, 423, 339–340; 126/9, 25, 30

[56] References Cited

UNITED STATES PATENTS

| | | |
|---|---|---|
| 2,720,827 | 10/1955 | DelFrancia ...........99/446 UX |
| 2,790,434 | 4/1957 | DelFrancia ...........99/446 UX |
| 2,848,990 | 8/1958 | Haedike et al. ........99/447 UX |
| 3,086,449 | 4/1963 | Cahill ..........................99/446 |
| 3,098,427 | 7/1963 | DelFrancia ..................99/446 |
| 3,444,805 | 5/1969 | Happel et al. ...............99/446 |
| 3,487,199 | 12/1969 | Hamlin ....................99/446 X |

*Primary Examiner*—Walter A. Scheel
*Assistant Examiner*—Arthur O. Henderson
*Attorney*—Johnson, Dienner, Emrich, Verbeck & Wagner

[57] ABSTRACT

An electric barbeque unit having an open-topped housing within which an imperforate open topped pan base is supported above which a grill to support food to be cooked is disposed, and with their being electrical heating element means arranged above the bottom of the pan base and below the grill with the electrical heating unit being substantially embedded in rocks supported in the base pan.

7 Claims, 3 Drawing Figures

PATENTED AUG 15 1972　　　　　　　　　　　3,683,792

Inventors:—
Richard M. Groves, Jr.,
Robert L. Cain,
Robert F. Senn.
By Johnson, Dienner, Emrich, Verbeck & Wagner
Attys.

ELECTRIC BARBEQUE UNIT

BACKGROUND OF THE INVENTION

The electric barbeque art is highly developed but even with the known devices efficient and economical barbecuing or cooking of food has not yet been obtained and especially so with standard electrical power source of 120 volt AC of 15 ampere service. Many known devices embody electrical heating units providing a source of heat, and the utilization of rocks heated by the electrical heating unit for cooking purposes. However, in the main, the prior art units noted embody perforated pans for supporting the rocks, and rely in large part on convection heating to barbeque foods supported on a grill above the rocks. Also, the art teaches that electrical heating units should not be embedded in the rocks which we have found to be in error.

THE INVENTION

According to the present invention, superior and efficient results in barbequing food is achieved by utilizing an imperforate base pan supported in an outer open topped housing for the unit. The base pan provides for the support of rocks and a grill for supporting food to be barbequed is supported above the upper edge of the base pan. Importantly, the electrical heating element means is positioned above the bottom of the base pan and is embedded in the rocks in a manner more particularly described hereinafter.

The components of the invention, as aforenoted, provide many desirable advantages making the barbeque unit efficient in operation and particularly for outdoor use with a power source as aforenoted. One advantage that may be achieved is that grease dripping from food being barbequed may be ignited producing flare resulting in a desirable charred outer surface of the food item, such as a steak, being cooked. Preferably the rocks supported in the base pan should be of low density and of high porosity so that they absorb the dripping from the food being cooked. Also, if desired, the temperature of the rocks may be maintained insufficient to ignite the drippings, to produce smoke which for some foods is a desired flavoring ingredient of open air cooking.

Still another advantage is that uniform heat distribution is obtained by the use of rocks in the manner aforementioned. The rocks absorb considerable heat from the electrical heating element means, and re-radiate the heat to other of the rocks or to the cooking surface of the grill resulting in a highly even temperature heat source for the cooking surface of the grill. The heat source has only small temperature gradients when passing over the surface of the rock bed in comparison to other open air elements or open flame heat sources which are used without the bed of rocks.

Importantly, the imperforate base pan and the rocks therein of this invention limit natural convection and exposure of the electrical heating element means so that the sheath of the electrical heating element means will reach a sufficient temperature to radiate infra red rays to the food on the grill.

DESCRIPTION OF A PREFERRED EMBODIMENT OF THE INVENTION

Figure 1:
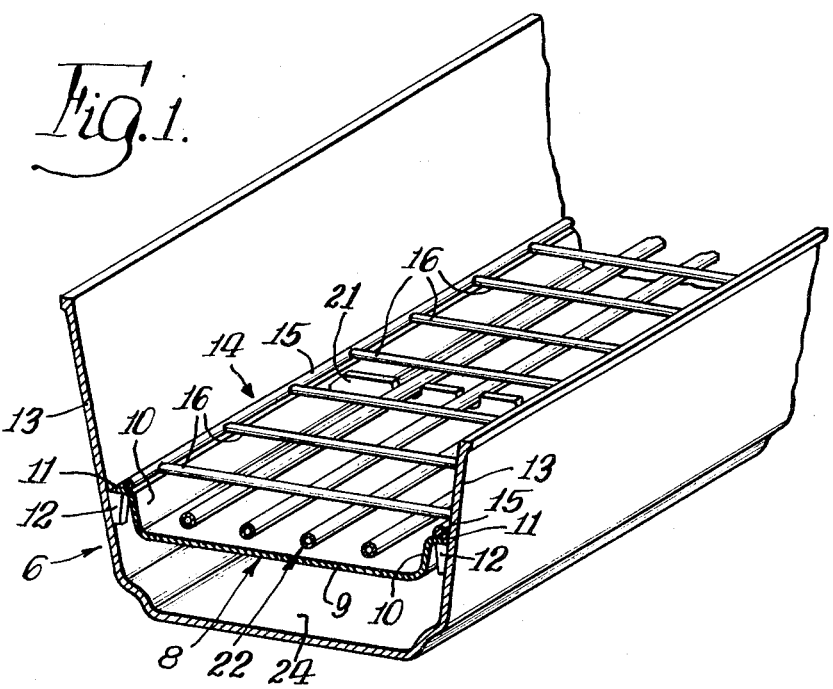
FIG. 1 is an isometric view of a portion of a barbeque unit embodying the present invention but with the rocks employed therewith not being shown for purposes of clarity.

Referring now to the drawings, there is shown a metal outer housing 6 open at its top which may be supported in any known conventional manner as by a central vertically extending post (not shown). Also, if desired, and as is known, an upper closing cover (not shown) may be pivotally mounted on the outer housing 6 so that the operator of the unit may open or close it at will to modify the cooking operation as may be desired by the operator.

According to the present invention an imperforate open topped metal base pan 8 having a bottom wall 9 and opposed side walls 10 provided with flanges, as at 11, to engage support members 12 mounted on the inside surfaces of the outer walls 13 of the outer housing 6 to support the base pan 8 in a horizontal plane within the outer housing 6. A grill as at 14 of conventional construction comprises opposed horizontally extending side rods 15 and transverse rods 16 with the rods 15 lying upon the upper outer surfaces of the flanges 11 to support the grill at the upper open end of the base pan 8.

Figure 3:
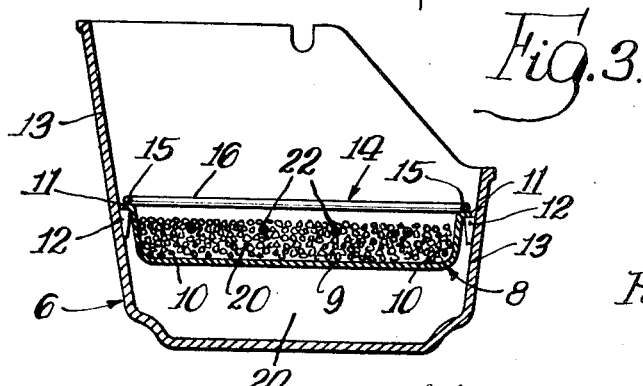
FIG. 3 is a sectional view taken along the line 3—3 of FIG. 2, looking in the direction indicated by the arrows, but with the food supporting grill and the rocks being shown to provide a barbeque unit according to the invention.

Base pan 8 supports a body of rocks as seen at 20 in FIG. 3, and electrical heating means 22 is embedded in the rocks 20. It is an important critical feature of this invention that the plane of the upper surface of the electrical heating means 22 lies below the upper surface of the plane defined by the rocks 20. The electrical heating means 22 is suitably supported intermediate its ends above the bottom wall of the base pan 8 in a slotted supporting bar 21 fixed at its opposite ends to the inner surfaces of the side walls 10 of pan 8. The upper surface defined by the rocks 20 preferably lies one-fourth to one-half inch below the surface of the grill 14, but if desired may extend to the plane of the bottom surface of the grill. In the construction shown in the drawings, a dead space 24 extends between the bottom and side walls of the base pan 8 and the bottom and side walls of the outer housing 6.

With the foregoing arrangement of components of the invention, a highly satisfactory and efficient barbeque unit operable on a standard 120 volt AC electrical outlet of 15 amphere service may be typically provided according to the following parameters.

Figure 2:
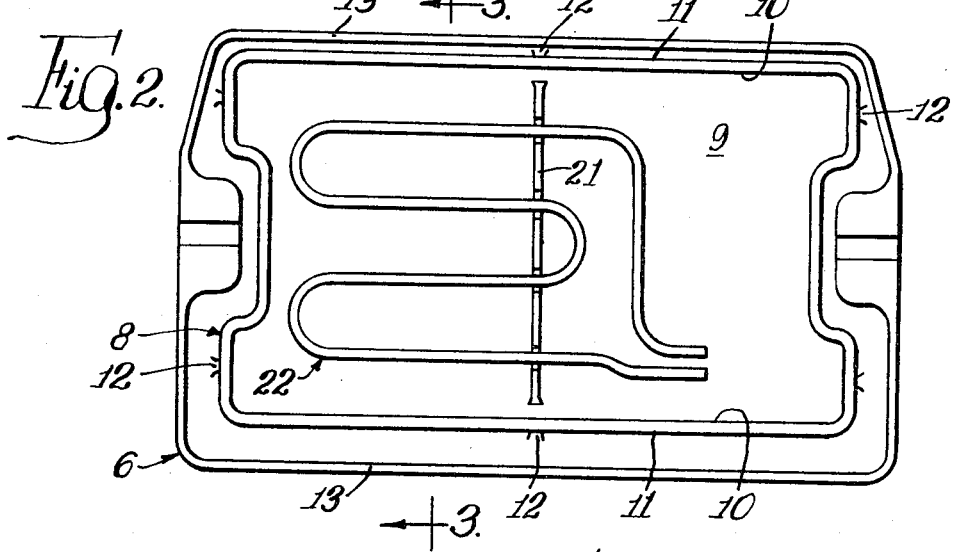
FIG. 2 is a plan view of the unit of FIG. 1 with the food supporting grill and rocks not being shown.

The electrical heating means 22 as shown in FIG. 2 may be of double hair pin construction. The element ends are preferably secured in a conventional manner in a disconnect type receptacle (not shown) to facilitate replacement of the element. A suitable typical electrical heating element means 22 that was satisfactorily employed in a barbeque unit constructed in accordance with the invention for a power source aforenoted had a power rating of 1,650 watts at 110 volt AC. The sheath material of the electrical heating element was Incoloy and of a nominal diameter of 0.315 inch. The heated length measured 62 inches and had a watt density of 26.9 watts per square inch. It will be understood that the foregoing specifications are not the only operable ones but are an example of a highly efficient unit according to the invention.

In the typical example illustrated the electrical heating element means 22 is supported above the bottom of the base pan 8 in a plane parallel with that of the cooking surface of grill 14. The elevation of the plane of the electrical heating element means 22 as shown is approximately centered between the bottom of the base pan 8 and the upper cooking surface of the grill 14.

In the foregoing preferred embodiment of the invention the rocks 20 of irregular shape had a specific gravity in a range of from about 0.37 to about 0.90, and ranged in size from a mean diameter of about one-fourth inch to about 1¼ inch. The rocks 20 may be synthetic according to the foregoing parameters or pumice rock prevalent in Santa Fe, New Mexico also admirably achieve the advantages of this invention.

Further, in the preferred embodiment of the invention above referred to, the electrical heater element means had the outer portions thereof lying approximately 2 inches inwardly of the walls of the base pan 8.

An important function of the rock bed 20 is to retard natural convection in the immediate area of the electrical heating element means 22.

The most optimum elevation of the rocks in the base pan is an elevation where the electrical heating element means 22 as viewed from the above is approximately 80 percent covered by the rocks 20, and 20 percent of the electrical heating element means is visible when looking straight down upon the bed of rocks directly over and perpendicular to the plane of the electrical heating element means 22 between the openings of the irregularly shaped rocks 20. The foregoing 20 percent exposure of the electrical heating element means is desirable but not necessary for the ignition of grease drippings. As previously noted, a limited amount of ignition of the drippings is desirable in certain cooking operations. However, as aforementioned, if flare up is not desirable, the electrical power can be reduced by a suitable switch (not shown) to give the electrical heating element means 22 a temperature below the flash point of the grease or residue present.

The invention claimed is:

1. An electric barbeque unit comprising an open-topped housing, an imperforate open-topped metal base pan within said outer housing, a grill for supporting food to be barbequed supported within said outer housing, above and in close proximity to the upper edge of said base pan, a rock bed supported in said base pan, and electrical heating means embedded in said bed of rocks in said base pan.

2. The electric barbeque unit of claim 1 characterized by said electrical heating means being substantially centered in said rock bed between the bottom of said base pan and the upper surface of said grill.

3. The electric barbeque unit of claim 1 in which said rocks of said rock bed have a specific gravity of from about 0.37 to about 0.90.

4. The electric barbeque unit of claim 2 in which said rocks of said rock bed have a specific gravity of from about 0.37 to about 0.90.

5. The electric barbeque unit of claim 4 in which said rocks of said rock bed are irregular in shape and range in size from a mean diameter of about one-fourth inch to about 1¼ inch.

6. The electric barbeque unit of claim 5 wherein the electrical heating means is embedded in the rock bed so that the electrical heating means as viewed from the top is approximately 80 percent covered by the rocks, and 20 percent of the electrical heating means is visible when looking straight down upon the rock bed and perpendicular to the plane of the electrical heating means between the openings of the irregularly shaped rocks.

7. The electric barbeque unit of claim 6 for operation from a power source of conventional 120 volt AC of 15 ampere service in which said electrical heating means is of double hair pin configuration of a power rating of about 1,650 watts at about 118 volt AC, and of a nominal diameter of 0.315 inch with a heated length of 62 inches and a watt density of 26.9 watts per square inch.

* * * * *